US008179649B2

(12) United States Patent
Chen

(10) Patent No.: US 8,179,649 B2
(45) Date of Patent: May 15, 2012

(54) PROTECTION CIRCUIT FOR CONTROL BOARD

(75) Inventor: Chien-Ping Chen, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 338 days.

(21) Appl. No.: 12/496,296

(22) Filed: Jul. 1, 2009

(65) Prior Publication Data

US 2011/0002074 A1 Jan. 6, 2011

(51) Int. Cl.
*H02H 3/00* (2006.01)

(52) U.S. Cl. ........................................................ 361/88

(58) Field of Classification Search ........................ None
See application file for complete search history.

(56) References Cited

U.S. PATENT DOCUMENTS 5,534,782 A * 7/1996 Nourse ......................... 324/500
2007/0115274 A1* 5/2007 Shih .............................. 345/211

* cited by examiner

*Primary Examiner* — Jared Fureman
*Assistant Examiner* — Terrence Willoughby
(74) *Attorney, Agent, or Firm* — Morris Manning & Martin LLP; Tim Tingkang Xia, Esq.

(57) ABSTRACT

A protection circuit for a control board is provided. The protection circuit is suitable for being disposed on a light on tester that may output a test voltage to a display module. The protection circuit includes a control device and a voltage stabilizer. The control device includes a first switching element and a control element. The control element enables the first switching element to output an operating voltage. The voltage stabilizer includes a second switching element and an operation module. The operation module may control the second switching element according to the operating voltage, so as to switch on or switch off an input of the test voltage to the display module.

11 Claims, 2 Drawing Sheets

PROTECTION CIRCUIT FOR CONTROL BOARD

BACKGROUND OF THE INVENTION

1. Field of Invention

The present invention relates to a protection circuit for an electronic element, and more particularly, to a protection circuit for a control board (COB).

2. Related Art

In the current process for manufacturing a liquid crystal display (LCD), after a liquid crystal module (LCM) is completed, usually a light on tester will be used to detect whether an image displayed on the LCM is normal or not, so as to find out faulty or abnormal liquid crystal modules.

As discussed above, the light on tester includes a probe set, which is in contact with electrodes of the LCM, such that the light on tester is electrically connected to the LCM. As such, the light on tester may output a test signal to the LCM from the probe set, so as to detect whether the image displayed on the LCM is abnormal.

However, during the process that the light on tester tests the LCM, when the probe set of the light on tester contact the electrodes of the LCM, or when the light on tester switches the image of the LCM, voltage abnormalities such as a surge or an unstable voltage might occur, such that a control board of the LCM will be easily burned. Therefore, it is a task to reduce the probability that the LCM is burned when it is tested by the light on tester.

SUMMARY OF THE INVENTION

The present invention is directed to a protection circuit for a control board, which reduces a probability that a display module is burned when the display module is tested by a light on tester.

A protection circuit for protecting control board is provided in the present invention. The protection circuit is suitable for being disposed on a light on tester. The light on tester may output a test voltage to a display module, and the protection circuit includes a control device and a voltage stabilizer. The control device includes a first switching element and a control element. The control element is electrically connected to the first switching element, and may enable the first switching element to output an operating voltage. The voltage stabilizer includes a second switching element and an operation module. The second switching element may be electrically connected between the display module and the light on tester. The operation module may control the second switching element according to the operating voltage, so as to switch on or switch off an input of the test voltage to the display module.

In one embodiment, the control element is a programmable logic controller (PLC).

In one embodiment, the first switching element is a transistor, an optical coupler (OC), or a relay.

In one embodiment, the operation module includes an operational amplifier and a voltage stabilizing element electrically connected to the operational amplifier. The voltage stabilizing element may modulate the operating voltage to a reference voltage. The operational amplifier may control a voltage value of the test voltage input to the display module according to the reference voltage and a feedback from the test voltage.

In one embodiment, a voltage value of the reference voltage is smaller than a voltage value of the operating voltage.

In one embodiment, the voltage stabilizing element is a voltage regulator IC or a voltage stabilization diode.

In an embodiment, the protection circuit further includes a third switching element electrically connected between the operation module and the second switching element. The third switching element may switch on or switch off the second switching element.

In an embodiment, the second switching element and the third switching element are transistors.

In an embodiment, the second switching element has a first base, a first collector, and a first emitter, and the third switching element has a second base, a second collector, and a second emitter. The first collector is electrically connected to the light on tester. The first emitter is electrically connected to the display module. The first base is electrically connected to the second emitter. The second base is electrically connected to an output end of the operational amplifier. The second collector is electrically connected to the first switching element.

In an embodiment, the voltage stabilizer further includes a first resistor, a second resistor, and a switch serially connected between the first resistor and the second resistor. The first resistor is serially connected between the first emitter and the switch. The operational amplifier receives the feedback of the test voltage from between the first resistor and the switch.

In an embodiment, the voltage value of the test voltage input to the display module satisfies the following formula:

$$Vdd = Vr \times (1 + R1/R2)$$

where Vdd is the voltage value of the test voltage input to the display module, Vr is the voltage value of the reference voltage, R1 is a resistance value of the first resistor, and R2 is a resistance value of the second resistor.

In an embodiment, the display module is a liquid crystal module (LCM).

The embodiments may use the operating voltage to switch on or switch off the second switching element, and further decide whether the test voltage can be input to the display module, so as to reduce the probability that the control board of the display module is burned.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
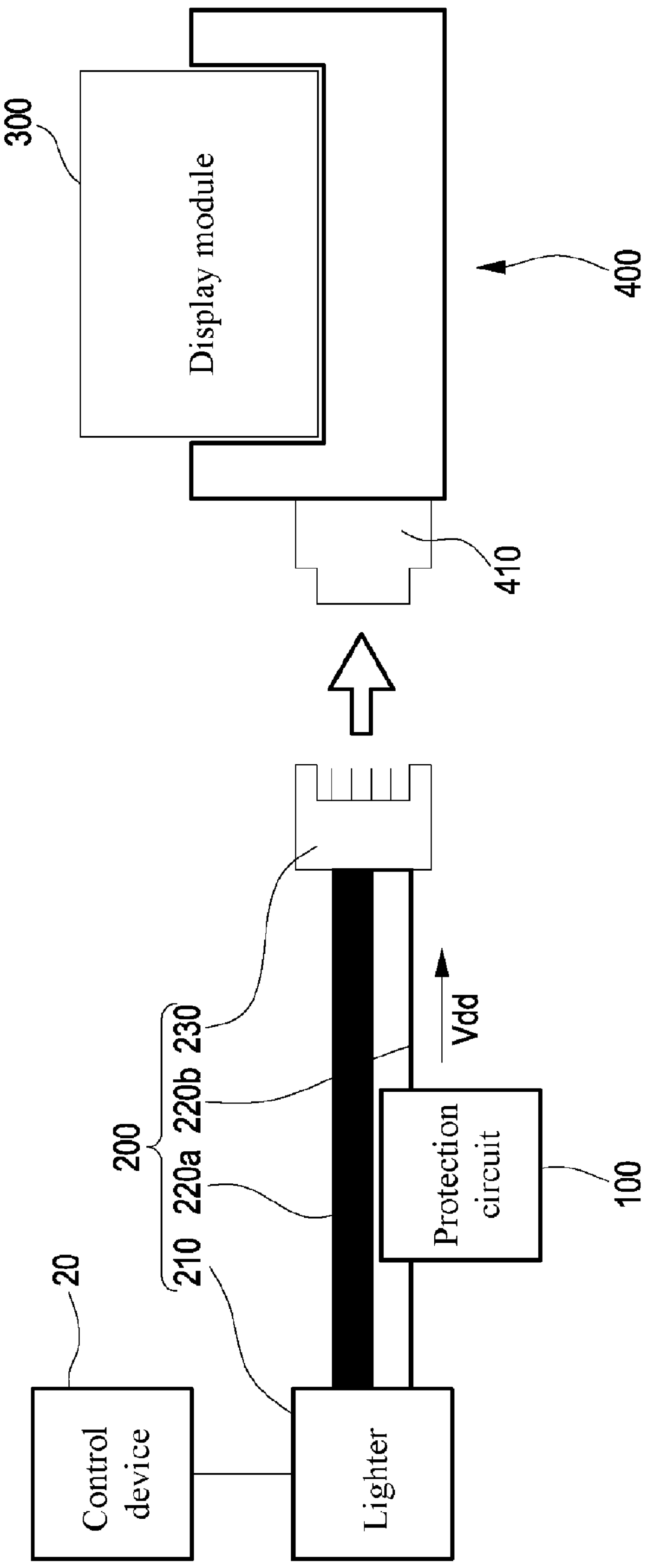
FIG. 1 is a schematic view of a light on tester applied in the present invention.

FIG. 1 is a schematic view of a light on tester applied in the present invention. Referring to FIG. 1, a protection circuit 100 is disposed on a light on tester 200, and the light on tester 200 may detect an image displayed on a display module 300. The display module 300 is, for example, an LCM.

Specifically, the light on tester 200 may be controlled by an operation device 20. The operation device 20 may be a computer. The light on tester 200 may include a lighter 210, a cable 220*a*, a power line 220*b*, and a probe set 230. The cable 220*a* and the power line 220*b* are electrically connected between the lighter 210 and the probe set 230. The lighter 210 may transmit a test signal to the probe set 230 through the cable 220*a*, and transmit a test voltage Vdd to the probe set

230 through the power line 220*b*. The protection circuit 100 is disposed on the power line 220*b*.

The display module 300 may be disposed on a pallet 400. The pallet 400 has a socket 410. The socket 410 and the display module 300 are electrically connected, and the probe set 230 may be inserted into the socket 410. After the probe set 230 is inserted into the socket 410, the probe set 230 is electrically connected to the display module 300 through the pallet 400. As such, the lighter 210 outputs the test signal to the display module 300 through the cable 220*a* so as to detect the image displayed on the display module 300, and outputs the test voltage Vdd to the display module 300 through the power line 220*b*.

As discussed above, the test voltage Vdd output from the lighter 210 will pass through the protection circuit 100 and be transmitted to the display module 300. In addition, it should be noted that, the test voltage Vdd is used to start the display module 300, so that the display module 300 displays the image. That is, the test voltage Vdd here is a power supply voltage that the light on tester 200 supplies to the display module 300.

Although for the light on tester 200 shown in FIG. 1, the probe set 230 of the light on tester 200 is electrically connected to the display module 300 indirectly through the pallet 400, in other embodiments that are not shown, the probe set 230 may also be directly electrically connected to the display module 300 without through the pallet 400. Thus, the pallet 400 shown in FIG. 1 is only for illustration purpose and is not intended to limit the present invention.

Figure 2:
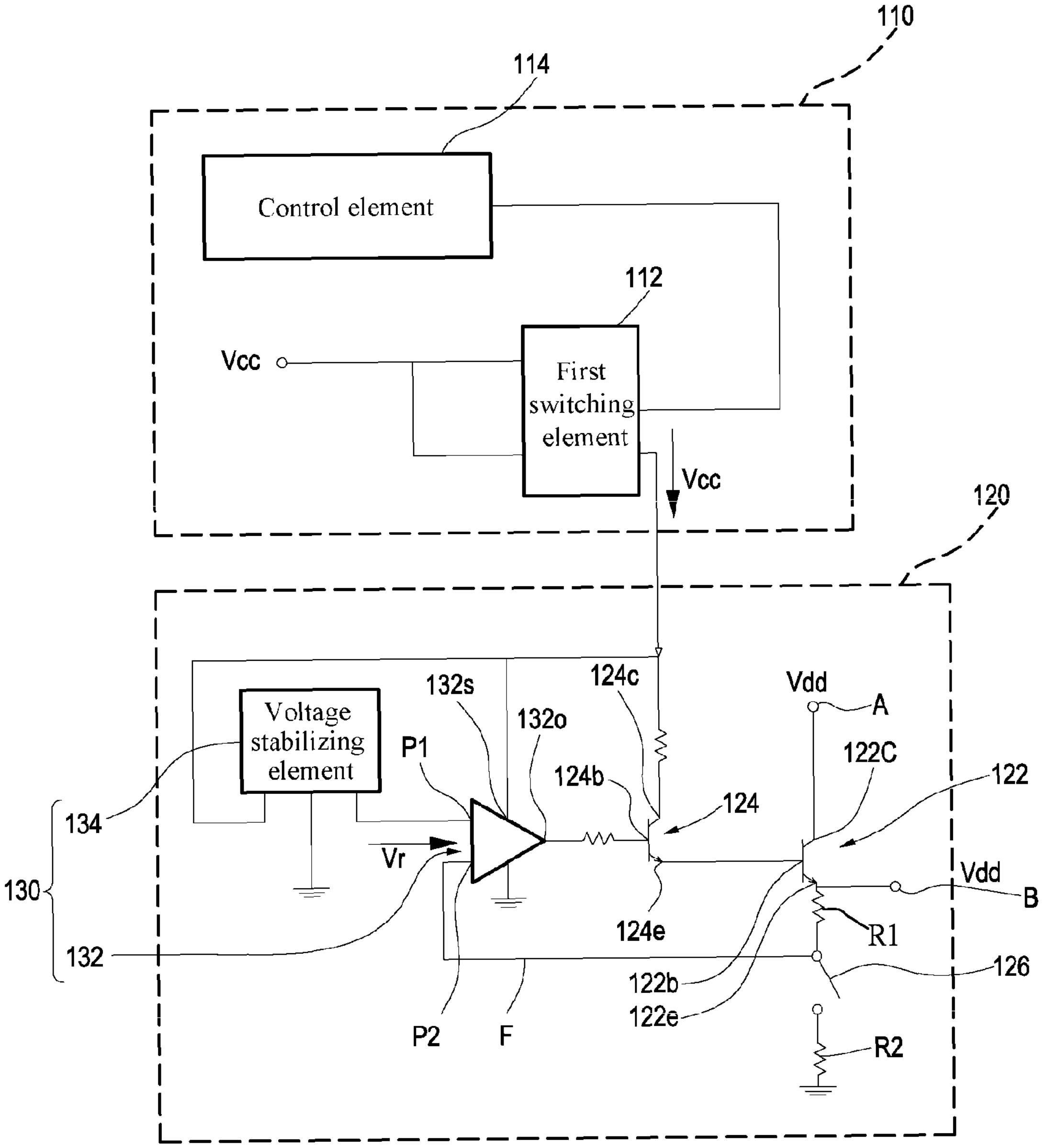
FIG. 2 is a schematic circuit diagram of the protection circuit in FIG. 1.

FIG. 2 is a schematic circuit diagram of a protection circuit in FIG. 1. Referring to FIGS. 1 and 2, the protection circuit 100 includes a control device 110 and a voltage stabilizer 120. The control device 110 is electrically connected to the voltage stabilizer 120. The control device 110 includes a first switching element 112 and a control element 114. The control element 114 is electrically connected to the first switching element 112. The control element 114 may enable the first switching element 112 to output an operating voltage Vcc, and enable the operating voltage Vcc to be input to the voltage stabilizer 120.

Specifically, the control element 114 may be a programmable logic controller (PLC) that may be controlled by the operation device 20. The first switching element 112 may be a transistor, an optical coupler (OC) or a relay. For example, the relay is an electromagnetic relay. The first switching element 112 may receive the operating voltage Vcc, and the control element 114 may control to switch on or switch off the first switching element 112.

When the first switching element 112 is switched on, the operating voltage Vcc may pass through the first switching element 112. As such, the first switching element 112 may output the operating voltage Vcc to the voltage stabilizer 120. When the first switching element 112 is switched off, the first switching element 112 will stop outputting the operating voltage Vcc.

The voltage stabilizer 120 includes a second switching element 122, a third switching element 124, and an operation module 130. The third switching element 124 is electrically connected between the second switching element 122 and the operation module 130. The second switching element 122 is electrically connected between the display module 300 and the light on tester 200. The operation module 130 may control the second switching element 122 according to the operating voltage Vcc, so as to switch on or switch off the input of the test voltage Vdd to the display module 300.

Specifically, the second switching element 122 and the third switching element 124 may be transistors. The second switching element 122 may be a transistor of the 2N3055 type, while the third switching element 124 may be a transistor of the 2N2655 type. The second switching element 122 may have a first base 122*b*, a first collector 122*c*, and a first emitter 122*e*. The third switching element 124 may have a second base 124*b*, a second collector 124*c*, and a second emitter 124*e*.

In this embodiment, for the second switching element 122, the first collector 122*c* may be electrically connected to the light on tester 200, that is, a contact A shown in FIG. 2 is electrically connected to the lighter 210 through the power line 220*b*. The first emitter 122*e* may be electrically connected to the display module 300, that is, a contact B shown in FIG. 2 is electrically connected to the probe set 230 through the power line 220*b*. A voltage value of the test voltage Vdd at the contact B is a voltage value of the test voltage Vdd input to the display module 300. Therefore, the test voltage Vdd output from the lighter 210 may be transmitted to contact B from contact A through the second switching element 122.

For the third switching element 124, the second emitter 124*e* is electrically connected to the first base 122*b*, so the third switching element 124 may switch on or switch off the second switching element 122. The second base 124*b* is electrically connected to the operation module 130, so the operation module 130 may switch on or switch off the third switching element 124, so as to control the second switching element 122 indirectly. The second collector 124*c* is electrically connected to the first switching element 112 such that the first switching element 112 may output the operating voltage Vcc to the third switching element 124.

When the operation module 130 switches on the third switching element 124, the operating voltage Vcc may enter the third switching element 124 from the second collector 124*c*, and may be transmitted to the first base 122*b* from the second emitter 124*e*. Thus, the second switching element 122 may be switched on, and the test voltage Vdd may be input to the display module 300 from contact A through contact B.

In this embodiment, the operation module 130 may use the operating voltage Vcc to switch on or switch off the third switching element 124. In detail, the operation module 130 includes an operational amplifier 132, and the operational amplifier 132 has a start end 132*s* and an output end 132*o*.

The first switching element 112 is electrically connected to the start end 132*s*, so that the operational amplifier 132 may receive the operating voltage Vcc, and the control element 114 may control the first switching element 112 to decide whether to output the operating voltage Vcc to the operational amplifier 132. The operational amplifier 132 starts to operate upon the reception of the operating voltage Vcc. That is, the operating voltage Vcc in this embodiment may be used to start the operational amplifier 132, so that the operational amplifier 132 may switch on or switch off the third switching element 124.

In addition, the operation module 130 further includes a voltage stabilizing element 134 electrically connected to the operational amplifier 132. In detail, the voltage stabilizing element 134 may be a voltage regulator IC or a voltage stabilization diode. A type of the voltage regulator IC may be 7805. The operational amplifier 132 further has a first input end P1 and a second input end P2. The voltage stabilizing element 134 is electrically connected to the first input end P1.

As discussed above, the voltage stabilizing element 134 is further electrically connected to the first switching element 112, so the voltage stabilizing element 134 may also receive the operating voltage Vcc. In addition, the voltage stabilizing element 134 may modulate the operating voltage Vcc into a reference voltage Vr, and transmit the reference voltage Vr from the first input end P1 to the operational amplifier 132. The reference voltage Vr may be smaller than the operating voltage Vcc. For example, the operating voltage Vcc may be 24 V, and the reference voltage Vr may be 5 V.

The operational amplifier 132 may control the voltage value of the test voltage Vdd input to the display module 300 according to the reference voltage Vr and a feedback of the test voltage Vdd. In detail, the voltage stabilizer 120 further includes a feedback line F, and the feedback line F is electrically connected between the first emitter 122*e* and the second input end P2. When the second switching element 122 is switched on, the test voltage Vdd may be transmitted to the second input end P2 through the feedback line F. Thus, the operational amplifier 132 may receive the feedback of the test voltage Vdd.

As discussed above, it is apparent to those of ordinary skill in the circuit technical field that the operational amplifier 132 will make the voltage at the first input end P1 and at the second input end P2 be equal. In detail, the operational amplifier 132 will control a degree of switching-on of the second switching element 122 through the third switching element 124, such that a voltage value at the second input end P2 is equal to a voltage value of the reference voltage Vr, so as to control the voltage value of the test voltage Vdd at contact B, that is, to control the voltage value of the test voltage Vdd input to the display module 300.

As the reference voltage Vr is modulated by the voltage stabilizing element 134, the voltage value of the reference voltage Vr is quite stable, and violent fluctuation is not likely to occur. Therefore, the operational amplifier 132 may further stabilize the voltage value of the test voltage Vdd input to the display module 300 according to the reference voltage Vr, so as to prevent burning of the control board of the display module 300. Thus, the operation module 130 not only may switch on or switch off the input of the test voltage Vdd to the display module 300, but also may further stabilize the input of the test voltage Vdd to the display module 300.

In this embodiment, the voltage stabilizer 120 may further include a first resistor R1, a second resistor R2, and a switch 126 serially connected between the first resistor R1 and the second resistor R2. The first resistor R1 is serially connected between the first emitter 122*e* and the switch 126. The operational amplifier 132 may receive the feedback of the test voltage Vdd from between the first resistor R1 and the switch 126.

As discussed above, the voltage value of the test voltage Vdd at contact B satisfies the following formula (1):

$$Vdd = Vr \times (1 + R1/R2) \quad (1)$$

As seen from the formula (1), the voltage value of the test voltage Vdd at contact B is related to the voltage value of the reference voltage Vr, a resistance value of the first resistor R1 and a resistance value of the second resistor R2. In addition, the formula (1) is derived from Ohm's law, and those of ordinary skill in the technical field of the present invention may easily derive the formula (1) from the circuit shown in FIG. 2, so the derivation process of the formula (1) is not illustrated here.

When the switch 126 is open, the path between the first resistor R1 and the second resistor R2 will be broken, so the resistance value of the second resistor R2 may be considered infinitely great. That is, when the switch 126 is open, the formula (1) may be modified to the following formula (2):

$$Vdd = Vr \quad (2)$$

Therefore, when the switch 126 is open, the voltage value of the test voltage Vdd at contact B is equal to the voltage value of the reference voltage Vr.

For example, in this embodiment, the resistance value of the first resistor R1 may be 10 k ohms, and the resistance value of the second resistor R2 may be 6.8 k ohms. The voltage value of the reference voltage Vr may be 5V. According to the electrical parameters above, when the switch 126 is closed, that is, when the first resistor R1 is in electrical connection with the second resistor R2, according to the formula (1), the voltage value of the test voltage Vdd at contact B is about 12V. When the switch 126 is open, according to the formula (2), the voltage value of the test voltage Vdd at contact B is 5V.

It should be noted that the functions of the third switching element 124 in this embodiment include current amplification. In detail, the third switching element 124 may amplify a current that flows into the first base 122*b* to a value great enough to open the second switching element 122. However, in other embodiments that are not shown, the voltage stabilizer 120 may also only include the second switching element 122, but does not include the third switching element 124. Thus, the third switching element 124 in FIG. 2 is an optional element, rather than a necessary element for the protection circuit 100. Therefore the third switching element 124 shown in FIG. 2 is only for illustration purpose, and is not intended to limit the present invention.

To sum up, the protection circuit of the present invention may use the operating voltage to start the operational amplifier, so as to switch on or switch off the second switching element to further decide whether to enable the test voltage to be input to the display module. Thus, the probability that the control board of the display module is burned because of voltage abnormalities such as a surge or an unstable voltage is reduced. For example, in the present invention, the input of the test voltage to the display module may be started 0.5 seconds after the probe set is inserted into the socket. As such, the problem that the control board of the display module is burned may be prevented.

Next, in the present invention, the voltage stabilizing element and the operational amplifier are used to control the voltage value of the test voltage input to the display module, so as to stabilize the voltage value of the test voltage that the display module receives. Therefore, when the light on tester is switching images on the LCM, the present invention may stabilize the output of the test voltage to the display module, so as to reduce the probability that the control board of the display module is burned.

The above descriptions of the embodiment are only intended to illustrate the present invention, but not to limit the present invention. Various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A protection circuit for a control board, the protection circuit being connected to a light on tester, wherein the light on tester outputs a test voltage to a display module, the protection circuit comprising:

a control device, comprising a first switching element and a control element, wherein the control element is electrically connected to the first switching element, and enables the first switching element to output an operating voltage; and a voltage stabilizer, comprising a second switching element and an operation module, wherein the second switching element is electrically connected between the display module and the light on tester, and the operation module controls the second switching element according to the operating voltage, so as to switch on or switch off an input of the test voltage to the display module, wherein the operation module comprises an operational amplifier and a voltage stabilizing element electrically connected to the operational amplifier, the voltage stabilizing element modulates the operating voltage into a reference voltage, and the operational amplifier controls a voltage value of the test voltage input to the display module according to the reference voltage and a feedback from the test voltage.

2. The protection circuit for a control board according to claim 1, wherein the control element is a programmable logic controller (PLC).

3. The protection circuit for a control board according to claim 1, wherein the first switching element is a transistor, an optical coupler (OC) or a relay.

4. The protection circuit for a control board according to claim 1, wherein a voltage value of the reference voltage is smaller than a voltage value of the operating voltage.

5. The protection circuit for a control board according to claim 1, wherein the voltage stabilizing element is a voltage regulator IC or a voltage stabilization diode.

6. The protection circuit for a control board according to claim 1, further comprising a third switching element electrically connected between the operation module and the second switching element, wherein the third switching element is capable of switching on or switching off the second switching element.

7. The protection circuit for a control board according to claim 6, wherein the second switching element and the third switching element is a transistor.

8. The protection circuit for a control board according to claim 7, wherein the second switching element comprises a first base, a first collector, and a first emitter, the third switching element has a second base, a second collector, and a second emitter, the first collector is electrically connected to the light on tester, the first emitter is electrically connected to the display module, the first base is electrically connected to the second emitter, the second base is electrically connected to an output end of the operational amplifier, and the second collector is electrically connected to the first switching element.

9. The protection circuit for a control board according to claim 8, wherein the voltage stabilizer further comprises a first resistor, a second resistor, and a switch serially connected between the first resistor and the second resistor, the first resistor is serially connected between the first emitter and the switch, and the operational amplifier receives the feedback of the test voltage from between the first resistor and the switch.

10. The protection circuit for a control board according to claim 9, wherein the voltage value of the test voltage input to the display module satisfies a following formula:

$$Vdd = Vr \times (1 + R1/R2)$$

wherein Vdd is the voltage value of the test voltage input to the display module, Vr is a voltage value of the reference voltage, R1 is a resistance value of the first resistor, and R2 is a resistance value of the second resistor.

11. The protection circuit for a control board according to claim 1, wherein the display module is a liquid crystal module.

* * * * *